United States Patent [19]
Heidrich

[11] Patent Number: 5,125,289
[45] Date of Patent: Jun. 30, 1992

[54] NOISE MUFFLING ASSEMBLY

[75] Inventor: Gunther Heidrich, Burgberg, Fed. Rep. of Germany

[73] Assignee: BHS-Bayerische Berg-, Hutten- und Salzwerke, Munich, Fed. Rep. of Germany

[21] Appl. No.: 355,009

[22] Filed: May 19, 1989

[30] Foreign Application Priority Data

May 20, 1988 [DE] Fed. Rep. of Germany ....... 3817320

[51] Int. Cl.⁵ ................... F16H 57/02; A47F 7/14
[52] U.S. Cl. .................... 74/606 R; 74/607; 248/901
[58] Field of Search .............. 74/606 R–609; 248/901

[56] References Cited

U.S. PATENT DOCUMENTS

| 2,903,840 | 9/1959 | Teupel et al. | 74/608 X |
| 4,596,162 | 6/1986 | Walter et al. | 74/608 |
| 4,683,771 | 8/1987 | Sogo et al. | 74/608 X |
| 4,686,868 | 8/1987 | Heidrich | 74/606 R |
| 4,720,240 | 1/1988 | Bronowski et al. | 74/606 R |
| 4,779,484 | 10/1988 | Poe | 74/608 |

FOREIGN PATENT DOCUMENTS

| 2153258 | 8/1972 | Fed. Rep. of Germany . |
| 2154905 | 5/1973 | Fed. Rep. of Germany ...... 248/901 |
| 2221804 | 3/1983 | Fed. Rep. of Germany . |
| 3217180 | 3/1983 | Fed. Rep. of Germany . |
| 3520501 | 7/1987 | Fed. Rep. of Germany . |
| 191996 | 1/1923 | United Kingdom . |
| 1589843 | 5/1981 | United Kingdom . |
| 2079368 | 1/1982 | United Kingdom . |

OTHER PUBLICATIONS

Basedow, Gunter "Das Reduzieren von Gerauschen an Stufen Losen Getrieben," Machinenmarkt 86:51 (1980) p. 1010.

Primary Examiner—Vinh T. Luong
Attorney, Agent, or Firm—Silverman, Cass & Singer, Ltd.

[57] ABSTRACT

A noise muffling assembly, particularly for use with toothed wheel gear units having a partitioned housing (1), within which moving machine elements (2) are positioned, the shafts (3, 4) of which are supported in the housing, whereby only one housing part (6) is, by the attachment bases (7, 7'), attached to a base (8). At least the housing part (6) which is connected by the attachment base (7, 7') to the base (8) supports the shafts (3, 4) and includes, between its shafts (3, 4) and the attachment bases (7, 7'), a plurality of separation points (10, 10') lying at a distance from one another in such a manner that a long sound route (S) results. The separation points (10, 10') each consist of noise muffling elements (11, 12) which are constructed independently of one another, and are joined together by connecting parts (19, 20, 21) and whereby the noise muffling element (12) lying at the greatest distance from the housing (1), has the attachment bases (7, 7').

15 Claims, 4 Drawing Sheets

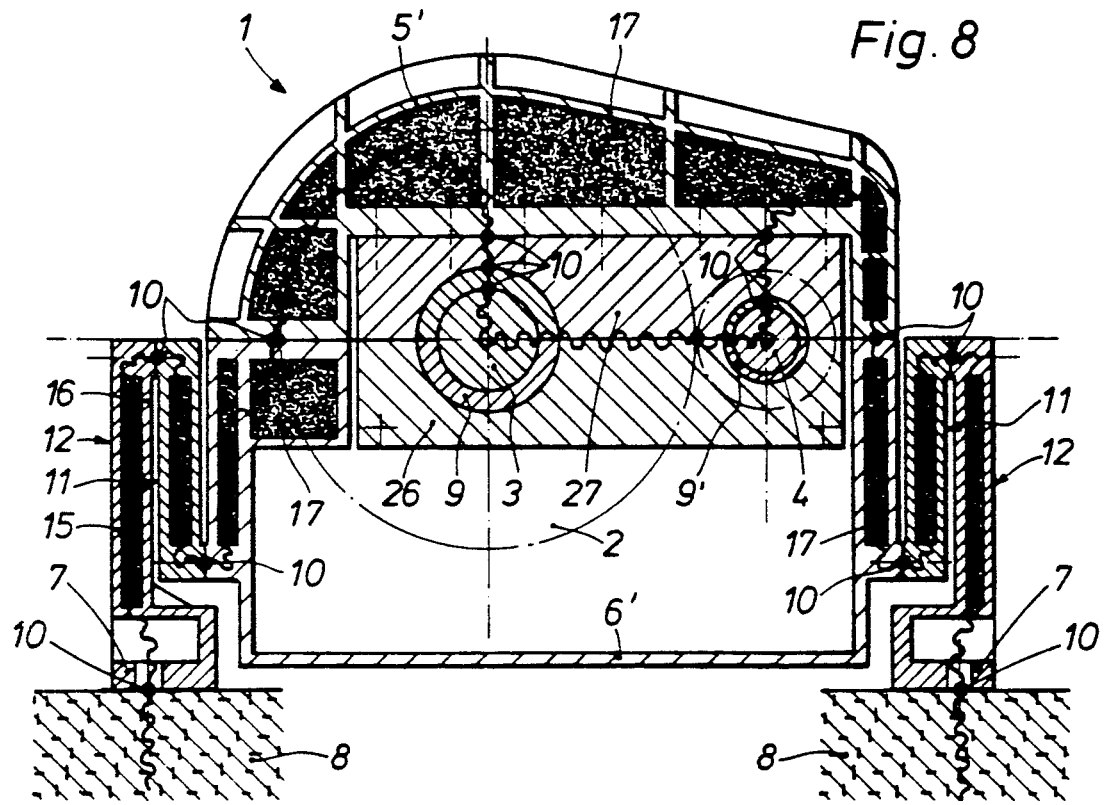
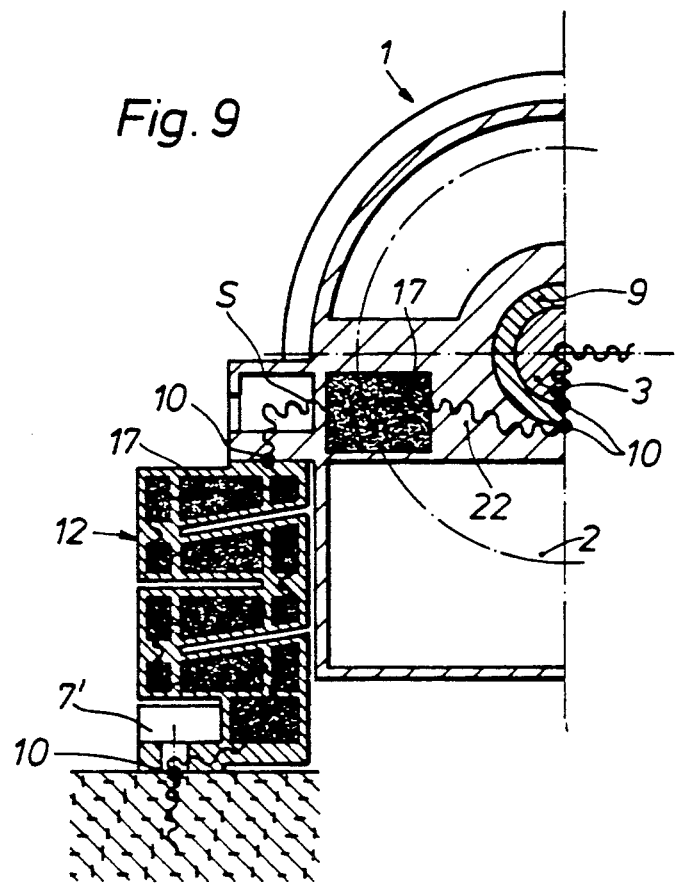

NOISE MUFFLING ASSEMBLY

BACKGROUND OF THE INVENTION

1. Field of the Invention

The invention relates to a noise muffling assembly, particularly involving toothed wheel gear units having a partitioned housing, within which moving machine elements are positioned and the shafts of which are supported in the housing where only one housing part is attached to a base by means of attachment bases.

2. Description of the Prior Art

Noise muffling assemblies are known. An example of a state of the art noise muffling assembly is disclosed in U.S. Pat. No. 4,686,868 having a corresponding German Patent No. DE-PS 35 20 501, and being in the name of the same Applicant and having the same assignee as the present invention. The assembly of that patent is constructed so that the shafts of the gear units are supported in bearing supports which are constructed separately from the housing. The bearing supports in turn are rigidly connected with the housing and are only attached to a portion of the housing which does not support the attachment base. This design requires a special construction of the individual housing parts which increases costs and space requirements and reduces the versatility in the design of the housing and noise muffling assembly.

Great Britain Patent No. GB-PS 191,996 discloses another existing assembly having a toothed wheel gear unit positioned inside a housing, the bearing supports of which are suspended in a spring-mounted manner both on the lower as well as on the upper part of the housing. This patent enables distance variations between gear axis to be eliminated or reduced and does not provide special measures for the reduction of the sound emissions issuing from the toothed wheel gear unit.

German Patent No. DE-PS 22 21 804 discloses another existing assembly having a crank housing for multiple cylinder piston engines in which the crank shaft can be removed at the bottom and cover supports are positioned under the removable crankshaft cover. Through the connection of the support cover with the support, a reinforcement of the housing is provided and thereby a reduction of engine noise is achieved.

German Patent No. DE-PS 32 17 180 discloses another existing assembly having housing parts with double walls forming hollow spaces therein which are filled with muffling material. This construction is very expensive in regard to the construction and mounting possibilities.

German Patent No. DE-OS 21 53 258 discloses another existing assembly which relates to the arrangement of connecting rods and base support screws in the housings of stroke piston machines whereby the base support screws are screwed into disks with cylindrical fitting surfaces. This design also results in a considerable construction expense.

It also is known to provide, within a housing part, special bearing supports which support the specific shafts of the moving machine parts at a distance from the housing parts.

In contrast to these existing assemblies, the object which forms the basis of the invention is that of creating a noise muffling assembly which makes possible in a simple manner, an effective improvement of noise muffling.

SUMMARY OF THE INVENTION

In accordance with the invention, at least the housing part which is connected with the base by means of the attachment bases has, between its shaft support and the attachment bases, several separation points positioned at a distance from one another in such a manner that a long sound route results. The separation points each consist of one or more noise muffling elements constructed independently of one another which are joined together by means of connecting parts. The noise muffling element positioned at the greatest distance from the housing includes the attachment bases.

This design provides for an effective improvement or a subsequent change of the noise muffling in a simple manner, even in finished assemblies, by means of a construction system which permits a universal application as well as a specific adjustment. The present invention enables the possibility of providing noise muffling elements with several separation points between the housing and the attachment bases without influencing the overall assembly in regard to its general construction. Thus, a long sound route advantageously can be provided from the point where the sound arises to the point where the sound is conveyed into the base through the several separation points stated above. The invention also provides an improvement of the overall muffling which is additionally improved by means of friction damping at the separation point surfaces of the individual muffling elements.

Accordingly, in the present invention, the number of noise muffling elements can be adjusted to the required noise reduction level of a particular application. This adjustment can also be carried out over the length and breadth of the noise muffling elements. In order to save space, the noise muffling elements also can be arranged to accommodate a round housing form.

The degree of muffling and the characteristic frequency of the noise muffling elements can later be advantageously altered without the actual assembly having to be altered as well. In addition, independent noise reduction measures can be carried out on the assembly so that a maximum level of noise reduction is made possible overall through the construction in accordance with the invention. For example, an asymmetrical corrugation can be utilized to provide a noise-reducing effect since this impedes the equiphase oscillation of the entire surface of the element.

The present invention, with its application of noise muffling elements and separation points not only can be used with a toothed wheel gear unit, but it is also possible to use other assemblies with rotating parts or parts moving back and forth. Through the analogous connection in series of individual noise muffling elements, there advantageously results a unit assembly system, the possibility of standardization, and a cost-effective provision of individual noise muffling elements.

The present invention also can be used with multiple-part housings, whereby, in turn, several separation points positioned at a distance from one another are created in such a manner to provide as long a sound route as possible.

The invention will now be illustrated in greater detail in the following description by means of examples of execution and with reference to the drawings.

BRIEF DESCRIPTION OF THE DRAWINGS

FIG. 8 is a frontal cross-sectional view similar to FIG. 1, of another embodiment of the noise muffling assembly; and FIG. 9 is a frontal cross-sectional view similar to FIG. 1, of another embodiment of the muffling assembly partially cut away.

DESCRIPTION OF THE PREFERRED EMBODIMENTS

Figure 1:
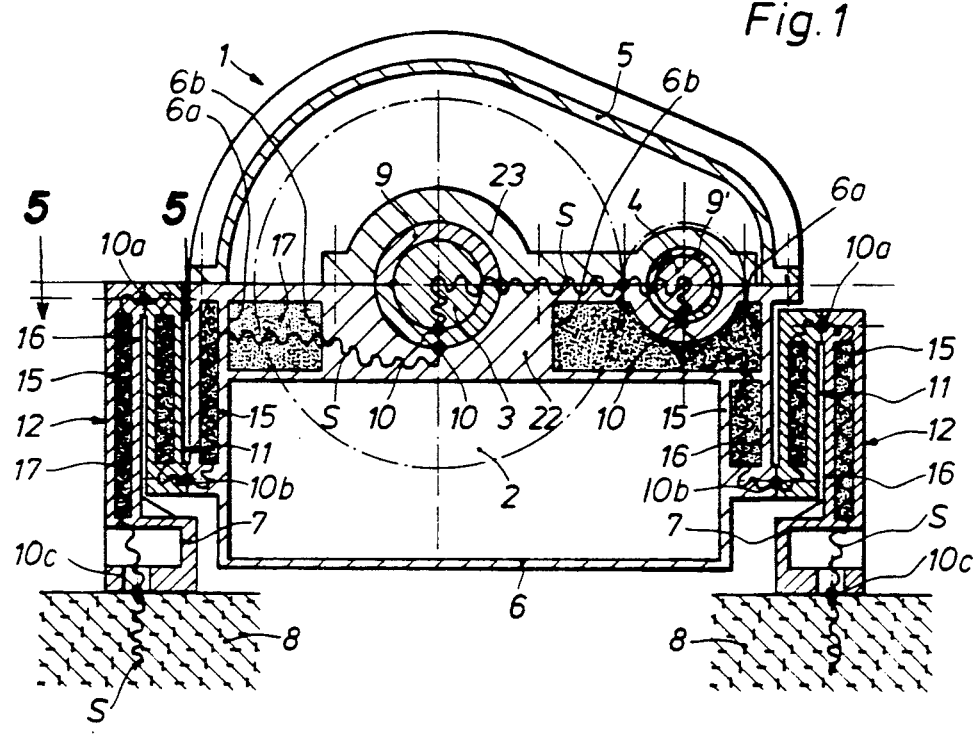
FIG. 1 is a frontal cross-sectional view of a noise muffling assembly of the invention.

The noise muffling assembly depicted in FIG. 1 includes a housing 1, which is attached on each end to a base 8 by means of attachment bases 7. The housing 1 is constructed in a partitioned manner and includes, in the present case, an upper housing part 5 and a lower housing part 6. Within the housing 1, there are positioned moving machine elements, such as, for example, a toothed wheel gear 2, which, by means of shafts 3 and 4 as well as shaft supports 9 and 9', are supported in a bearing support 22 by means of support brackets 23. The bearing support 22 is constructed in a single piece integral with the lower housing part 6, whereas the support bracket 23 is, by means of further screw connections, connected with the bearing support 22. As FIG. 1 illustrates, between the lower housing part 6 and the attachment bases 7 first and second noise muffling elements 11 and 12 are preferably positioned. The noise muffling element 12 is so constructed that it supports or includes the attachment bases 7.

Each of these noise muffling elements 11 and 12 is constructed in a double-walled manner having two walls 15 and 16 positioned at a distance from one another. Noise muffling material 17 preferably is positioned between these walls. Also, on both sides of the bearing support 22, the lower housing part 6 has two walls 6a and 6b positioned at a distance from one another forming a hollow space therebetween which can include muffling material 17 positioned in the hollow spaces.

It is to be noted that, wherever possible, the same reference numerals are utilized to identify like elements in each embodiment described herein.

As FIG. 1 illustrates the noise muffling element 11 is positioned as an intermediary element between the lower housing part 6 and the noise muffling element 12 which is provided with the attachment bases 7. This arrangement provides a plurality of interfaces or lines or separation points 10 positioned at a distance from one another, 10a of which represents the interface or separation as well as the connection between the individual noise muffling elements 11 and 12, 10b of which represents the connection between the noise muffling elements 11 and the housing part 6, and 10c of which represents the separation and connection between the noise muffling elements 12 and the lease plate 8. The structure providing the connection between the separation points 10 will be described in detail below with regard to FIG. 5. A sound route S is thereby provided which initially arises in the area of the toothed wheels, proceeds through the shafts 3 and 4 and the shaft supports 9 and 9', into the bearing support 22, and are conducted from there through the lower and upper separation points 10 and outwardly to the base 8.

As FIG. 1 illustrates, the housing part 6 which is connected with the base 8 by means of the attachment bases 7 has, between the shafts 3 and 4 and the attachment bases 7, several separation points 10 positioned at a distance from one another in such a manner, that a long sound route S thereby results. Thus, the separation points 10 are each present between the lower housing part 6 and the noise muffling elements 12 provided with the attachment bases 7. The separation points 10 are thereby positioned in parallel with the longitudinal axis of the shafts 3 o 4.

Figure 2:
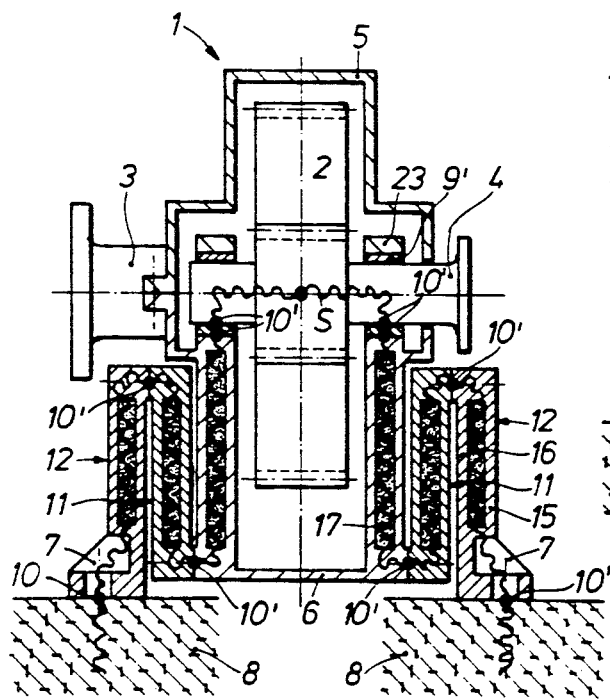
FIG. 2 is a lateral cross-sectional view of another embodiment of the noise muffling assembly.

FIG. 2 illustrates another embodiment of the noise muffling assembly which is so constructed that noise muffling elements 11 and 12 are again employed, whereby each noise muffling element 12 is provided with an attachment base 7. Separation points 10' are provided, however, which proceed perpendicularly to the longitudinal axis of the shafts 3 or 4. A long sound route S from its place of origin to the base 8 is also created in this construction.

Figure 3:
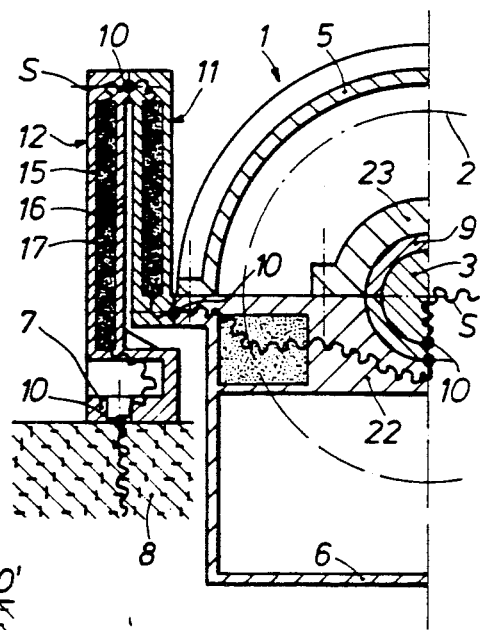
FIG. 3 is a frontal cross-sectional view, similar to FIG. 1 of another embodiment of the noise muffling assembly, partially cut away.

FIG. 3 illustrates another embodiment of the noise muffling assembly in which the noise muffling elements 11 and 12 are raised upwardly and project into the area adjacent the upper housing part 5. The external noise muffling element 12 again has the attachment base 7 whereby separation points 10 again arise in the connecting area for the individual elements. Thus, it is possible to position the attachment bases 7 in the area of the shaft axis plane with approximately the same length of the sound route S as in FIG. 1.

Figure 4:
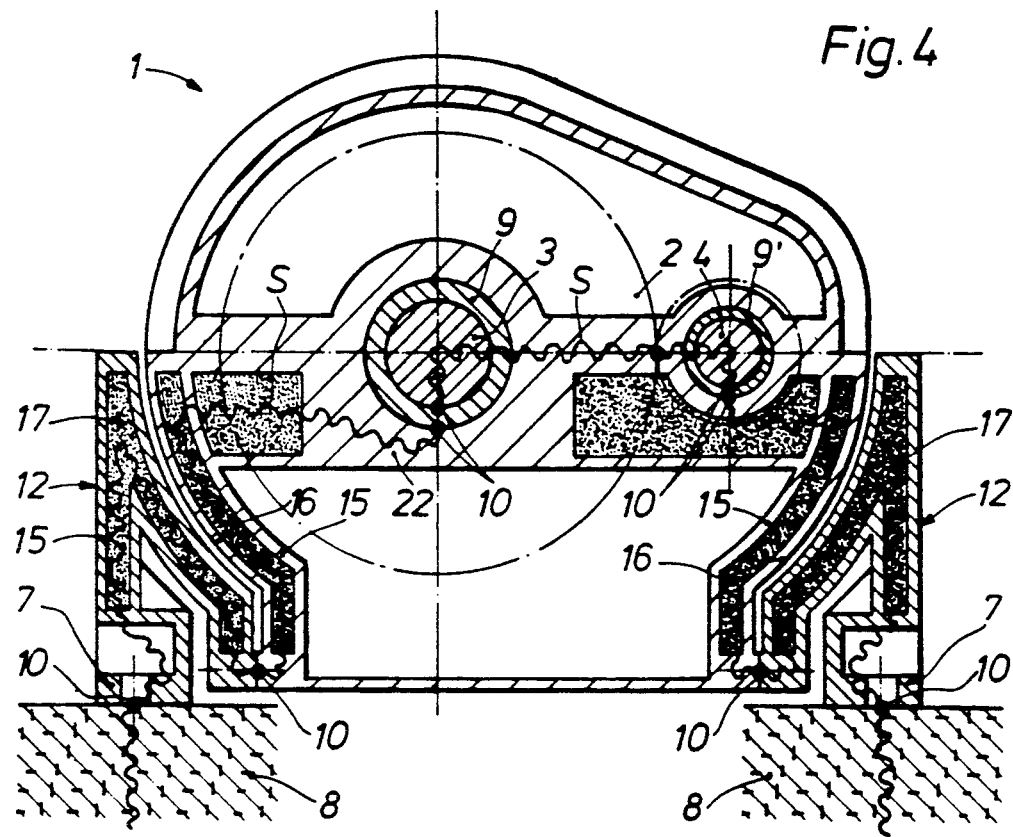
FIG. 4 is a frontal cross-sectional view, similar to FIG. 1 of another embodiment of the noise muffing assembly.

FIG. 4 illustrates another embodiment of the noise muffling assembly where the noise muffling element 12 and the housing 1 have shell shaped units which are curved in a quarter-circle shape with walls 15 and 16. With this design a space-saving arrangement advantageously results since the base supports 7 connected with the noise muffling element 12 are inserted into the area previously occupied by the housing 1 of the noise muffling assembly. Muffling materials 17 are again inserted into the intermediate areas between the individual walls 15 and 16.

Figure 5:
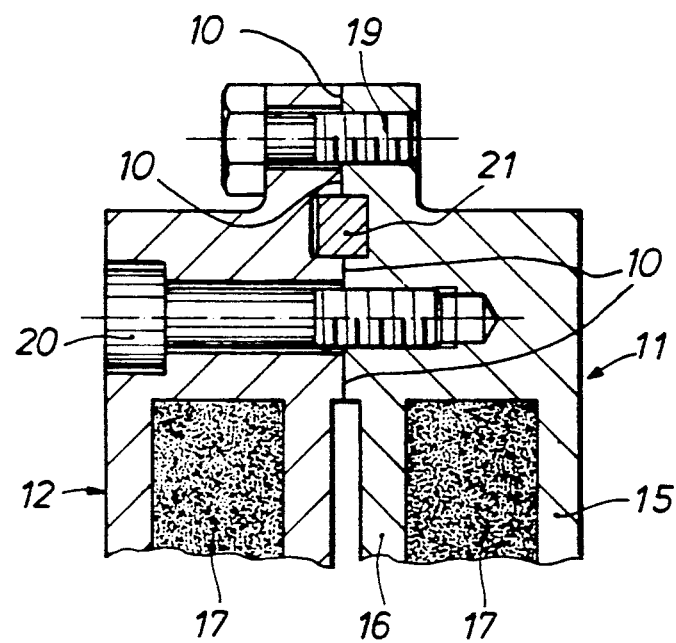
FIG. 5 is an enlarged cross-sectional view of a joint connection between two noise muffling elements taken along line 5—5 of FIG. 1 and in the direction indicated generally.

FIG. 5 illustrates the joining of the two noise muffling elements 11 and 12 across the interface or separation point 10a. More specifically, two screws 19 and 20 are positioned in parallel and at a distance from one another, between which a joint connection 21 is provided. A bend-resistant and precisely fitting connection of the individual noise muffling elements 11 and 12 is thereby achieved. It is to be noted that each of these noise muffling elements 11 and 12 has walls 15 and 16 positioned at a distance from one another whereby muffling material 17 is inserted into the intermediate space between these walls.

As FIG. 4 illustrates, the housing 1 is, by means of the separation point 10, directly connected with the noise muffling element 12 in such a manner, that a long route S results. FIGS. 1-3 illustrate, however, that instead of this arrangement, an additional noise muffling element 11 is provided as an intermediary element between the lower housing part 6 and the noise muffling element 12 which is provided with attachment bases 7.

Figure 7:
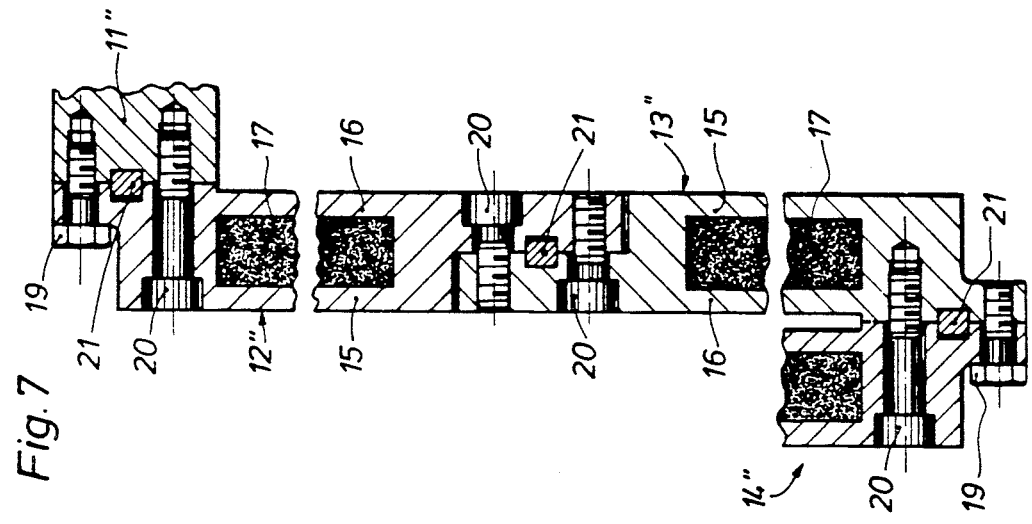
FIG. 7 is an enlarged cross-sectional view, similar to FIG. 6, of another embodiment of the noise muffling elements.
Figure 6:
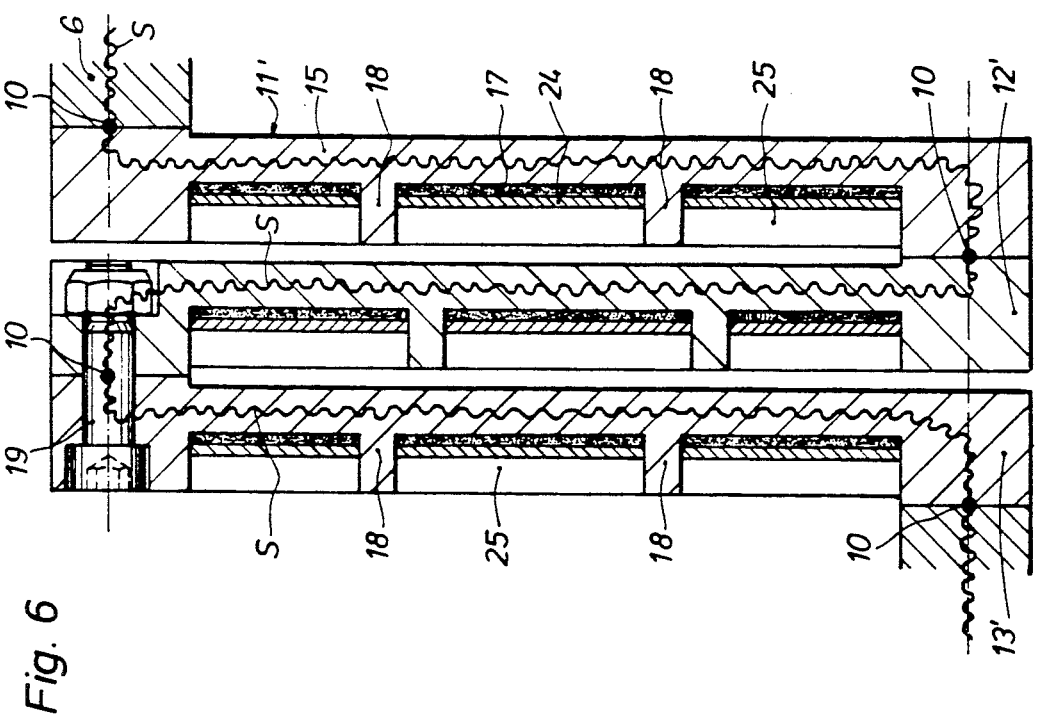
FIG. 6 is an enlarged cross-sectional view, similar to FIG. 5, of another embodiment of the assembly having three noise muffling elements.

FIGS. 6 and 7 illustrate other embodiments of the noise muffling elements which consist of positioning several noise muffling elements to form unit assemblies which are positioned next to each other or behind one another. In accordance with FIG. 6, first, second, and third noise muffling elements 11', 12' and 13' are positioned next to one another whereby the separation points 10 again each lie at a great distance from one another. The individual noise muffling elements 11' 12' and 13' are again connected with one another by means of the connecting elements 19 which join the interfaces or separation points 10a, 10b and 10c as well as a separation point 10d, where 10c is the interface between and connects noise muffling elements 12' and 13' and 10d is the interface between and connects noise muffling element 13' to the base 7'. The noise muffling elements 11', 12' and 13' also 19 and are formed in a double-walled manner with the external wall 15 and a cover sheet 24 positioned at a distance from the wall 15, whereby insulating or muffling material 17 is positioned between the cove sheet 24 and the wall 15. The wall 15 furthermore can include several transverse corrugations or partitions 18 lying asymmetrically at a distance from one another, so that overall an asymmetrical corrugation results. Corresponding corrugations or cavities 25 thereby are provided between the individual corrugation elements 18. It is thereby possible to position several noise muffling elements 11', 12' and 13' behind one another, if there is a need to create a particularly long sound route S.

Although FIG. 6 illustrates the individual noise muffling elements 11', 12' and 13' being positioned next to one another, as FIG. 7 illustrates, the possibility also exists of positioning the individual noise muffling elements 12" and 13" in a geometrical pattern behind one another, if there is sufficient space, with or without the noise muffling element 14". Each of these noise muffling elements 12" and 13" again has walls 15 and 16 positioned at a distance from another, between which the muffling material 17 is positioned. The individual noise muffling elements 12" and 13" are connected with one another, by means of joint connections 21 and screws 19 and 20.

FIG. 8 illustrates another embodiment of the noise muffling assembly where the shafts 3 and 4 are positioned, by means of their shaft supports 9 and 9', on a two-part bearing support with one lower support part 26 and one upper support part 27. The lower bearing support 26 is screwed onto the upper bearing support 27, which in turn is connected with the upper housing part 5'. The upper housing part 5' has a number of chambers into which muffling material 17 is inserted. The lower housing part 6' again, by means of the separation point 10, is connected with a noise muffling element 11, which in turn is connected with the noise muffling element 12 by means of the separation point 10, with which the noise muffling element 12 and the attachment supports or bases 7 are integrally formed.

FIG. 9 illustrates another embodiment of the noise muffling assembly where the housing 1 is, by means of noise muffling element 12 and an attachment base 7', connected with the base 8, whereby the noise muffling element 12 has several chambers positioned above one another, so that a very long sound route S results overall.

It is common to all the above-stated embodiments that at least the housing part 6 or 6' is connected with the base 8 by means of the attachment bases 7 and 7' and includes between its shafts 3 and 4 and the attachment base, several separation points 10 or 10' positioned at a distance from one another in such a manner that a longer sound route S arises overall. The separation points 10 or 10' each consist of one or more noise muffling elements constructed independently of one another and the housing and are joined by means of connecting parts, whereby the noise muffling element 12 is positioned at the greatest distance from the housing 1 and has the attachment bases 7 and 7'.

The separation points 10 can proceed in a direction either parallel or perpendicular to the longitudinal axis of the shaft or shafts. Individual noise muffling elements 11 or 12 can be positioned either next to one another behind one another, or above one another in order to attain an extension of the sound route depending on the particular requirements for noise reduction. Thus, there advantageously arises an adaptation similar to a unit assembly, whereby the number of the noise muffling elements 11 or 12 can be adjusted to the required level of noise reduction. Noise muffling elements can also be provided with torsion-resistant, asymmetrical corrugations which are located, for example, with highly effective muffling materials in accordance with the sandwich process or stacked arrangement as described. The connection of the individual noise muffling elements to the housing and the attachment bases as well as among one another may take place in a loosenable or releasable manner by means of screw-connected joint connections which are constructed in a bend-resistant and displacement-resistant manner against the forces from the weight and reaction torque of the assembly. The attachment bases 7 and 7' are advantageously drawn for the purpose of reducing the construction space, as the noise reduction requires, into the housing area and thereby positioned in a space-saving manner.

The physically well-grounded principle of noise reduction is based on the fact that the components are stimulated to vibration by the sound flowing through and conducted through solid bodies. Therefore, inside the muffling material, because of internal friction, vibration energy is eliminated through conversion into heat.

This elimination of vibration energy is greatly increased through the very long sound route which is possible in accordance with the invention.

Vibration energy is further reduced by means of additional bending vibrations which arise in the muffling elements of the invention through which friction is in turn produced in the muffling material.

One further improvement of the invention additionally results through the large number of separation points and the friction from micro-movements acting on the separation point surfaces.

I claim:

1. A noise muffling assembly including a partitioned housing (1) inside which moving machine elements (2) are positioned the machine elements (2) including shafts (3, 4) supported in the housing (1) where a first portion (6) of the partitioned housing (1) is to be connected to a base plate (8), the assembly comprising:

at least first and second noise muffling elements (11, 12) which are constructed independently of one another;

first connecting means (19, 20 and 21) for connecting said first noise muffling element (11) to the first portion (6) of the partitioned housing (1);

second connecting means 19, 20 and 21 for connecting said first noise muffling element (11) to said second noise muffling element (12); and base attachment means (7) formed in one-piece with said second noise muffling element (12) for connecting said second noise muffling element (12) to the base plate (8) to form a long sound route S between the housing (1) and the base plate (8) for dissipation of noise and vibration, produced by the shafts (3, 4) of the machine elements (2), within said first and second noise muffling elements (11, 12) and said first and second connecting means along said sound route S.

2. The assembly as defined in claim 1 including a third noise muffling element positioned between said first and second noise muffling elements, and wherein said second connecting means connect said first noise muffling element to said third noise muffling element and including third connecting means for connecting said third noise muffling element to said second noise muffling element.

3. The assembly as defined in claim 1 including a third noise muffling element (13') positioned between said first and second noise muffling elements (11, 12), connected to said first noise muffling element (11) by said second connecting means and including third connecting means (19, 20 and 21) for connecting said third noise muffling element (13') to said second noise muffling assembly (12).

4. The assembly as defined in claim 1 wherein a portion of said base attachment means extends beneath the housing part (6).

5. The assembly as defined in claim 1 wherein said first and second noise muffling elements (11, 12) each include at least two elongate opposing walls (15, 16), at least one wall (15, 16) of said noise muffling elements (11, 12) being provided with a corrugation (18).

6. The assembly as defined in claim 5 wherein said corrugation (18) is constructed as an asymmetrical internal corrugation.

7. The assembly as defined in claim 1 wherein said housing (1) includes a second upper portion (5) and where both said first and second housing portions (5, 6) are connected to the base plate (8) by means of said noise muffling elements (11, 12).

8. An assembly in accordance with claim 7 in which said shafts (3, 4) are supported by a bearing support (22) positioned within said first housing portion (6).

9. A noise muffling assembly including a partitioned housing (1) inside which moving machine elements (2) are positioned, the machine elements (2) including shafts (3, 4) supported in the housing (1) where a first portion (6) of the partitioned housing (1) is to be connected to a base plate (8), the assembly comprising:

at least first and second noise muffling elements (11, 12) which are constructed independently of one another;

first connecting means (19, 20 and 21) for connecting said first noise muffling element (11) to the first portion (6) of the partitioned housing (1);

second connecting means (19, 20 and 21) for connecting said first noise muffling element (11) to said second noise muffling element (12);

base attachment means (7) formed in one-piece with said second noise muffling element (12) for connecting said second noise muffling element (12) to the base plate (8) to form a long sound route S between the housing (1) and the base plate (8) for dissipation of noise and vibration, produced by the shafts (3, 4) of the machine elements (2), within said first and second noise muffling elements (11, 12) and said first and second connecting means along said sound route S; and said first and second connecting means each including at least one substantially elongate fastening member (19) where the longitudinal axis of each of said fastening member (19) substantially is parallel to the longitudinal axis of said shafts (3, 4) of said machine elements (2).

10. A noise muffling assembly including a partitioned housing (1) inside which moving machine elements (2) are positioned, the machine elements (2) including shafts (3, 4) supported in the housing (1) where a first portion (6) of the partitioned housing (1) is to be connected to a base plate (8), the assembly comprising:

at least first and second noise muffling elements (11, 12) which are constructed independently of one another;

first connecting means (19, 20, and 21) for connecting said first noise muffling element (11) to the first portion (6) of the partitioned housing (1);

second connecting means (19, 20 and 21) for connecting said first noise muffling element (11) to said second noise muffling element (12);

base attachment means (7) formed in one-piece with said second noise muffling element (12) for connecting said second noise muffling element (12) to the base plate (8) to form a long sound route S between the housing (1) and the base plate (8) for dissipation of noise and vibration, produced by the shafts (3, 4) of the machine elements (2), within said first and second noise muffling elements (11, 12) and said first and second connecting means along said second route S; and said first and second noise muffling elements (11, 12) being elongate and each including at least two elongate opposing walls (15, 16) positioned a predetermined distance from one another, said two elongate opposing walls (15, 16) being contained in planes which are substantially parallel to the longitudinal axis of said shafts (3, 4) of said machine elements (2).

11. The assembly as defined in claim 15 including noise muffling material (17) positioned between said opposing walls (15, 16) of said first and second noise muffling elements (11, 12).

12. A noise muffling assembly including a partitioned housing (1) inside which moving machine elements (2) are positioned, the machine elements (2) including shafts (3, 4) supported in the housing (1) where a first portion (6) of the partitioned housing (1) is to be connected to a base plate (8), the assembly comprising:

at least first and second noise muffling elements (11, 12) which are constructed independently of one another;

first connecting means (19, 20 and 21) for connecting said first noise muffling element (11) to the first portion (6) of the partitioned housing (1);

second connecting means (19, 20 and 21) for connecting said first noise muffling element (11) to said second noise muffling element (12);

base attachment means (7) formed in one-piece with said second noise muffling element (12) for connecting said second noise muffling element (12) to the base plate (8) to form a long sound route S between the housing (1) and the base plate (8) for dissipation of noise and vibration, produced by the shafts (3, 4) of the machine elements (2), within said first and second noise muffling elements (11, 12) and said first and second connecting means along said sound route S; and said first and second connecting means each including at least two screws (19, 20) and a joint connection (21).

13. A noise muffling assembly including a partitioned housing (1) inside which moving machine elements (2) are positioned the machine elements (2) including shafts (3, 4) supported in the housing (1) where a first portion (6) of the partitioned housing (1) is to be connected to a base plate (8), the assembly comprising:

at least first and second noise muffling elements (11, 12) which are constructed independently of one another;

a first interface (10b) between said first noise muffling element (11) and said first portion (6) of the partitioned housing (1);

first connecting means (19, 20 and 21) for connecting said first noise muffling element (11) to the first portion (6) of the partitioned housing (1) across said first interface;

a second interface (10a) between said first noise muffling element (11) and said second noise muffling element (12);

second connecting means (19, 20 and 21) for connecting said first noise muffling element (11) to said second noise muffling element (12) across said second interface; and base attachment means (7) formed in one-piece with said second noise muffling element (12) for providing a third interface (10c) and third connecting means (19, 20 and 21) between said second noise muffling element (12) and the base plate (8) to form a long sound route S between the housing (1) and the base plate (8) for dissipation of noise and vibration, produced by the shafts (3, 4) of the machine elements (2), within said first and second noise muffling elements (11, 12) and said first and second connecting means along said sound route S.

14. The assembly as defined in claim 13 wherein said first and second interfaces (10b, 10a) are substantially planar and are contained in respective planes which are substantially parallel to the axis of the shafts (3, 4).

15. The assembly as defined in claim 13 wherein said first and second interfaces (10b, 10a) are substantially planar and are contained in respective planes which are substantially perpendicular to the axis of the shafts (3, 4).

* * * * *